US011617961B2

(12) United States Patent
Thielbar

(10) Patent No.: US 11,617,961 B2
(45) Date of Patent: Apr. 4, 2023

(54) ONLINE TOURNAMENT INTEGRATION

(71) Applicant: SONY INTERACTIVE ENTERTAINMENT INC., Tokyo (JP)

(72) Inventor: Christopher Thielbar, San Mateo, CA (US)

(73) Assignee: SONY INTERACTIVE ENTERTAINMENT INC., Tokyo (JP)

( * ) Notice: Subject to any disclaimer, the term of this patent is extended or adjusted under 35 U.S.C. 154(b) by 0 days.

(21) Appl. No.: 17/207,679

(22) Filed: Mar. 21, 2021

(65) Prior Publication Data
US 2021/0205711 A1 Jul. 8, 2021

Related U.S. Application Data

(63) Continuation of application No. 15/908,569, filed on Feb. 28, 2018, now Pat. No. 10,953,335.

(51) Int. Cl.
A63F 13/86 (2014.01)
A63F 13/795 (2014.01)
A63F 13/798 (2014.01)

(52) U.S. Cl.
CPC .......... A63F 13/795 (2014.09); A63F 13/798 (2014.09); A63F 13/86 (2014.09)

(58) Field of Classification Search
None
See application file for complete search history.

(56) References Cited

U.S. PATENT DOCUMENTS 5,729,471 A 3/1998 Jain et al.
5,995,518 A 11/1999 Burns et al.
6,415,317 B1 7/2002 Yelon et al.
6,546,421 B1 4/2003 Wynblatt et al.
6,631,522 B1 10/2003 Erdelyi
6,877,134 B1 4/2005 Fuller et al.
7,499,475 B2 3/2009 Kashiwagi et al.
(Continued)

FOREIGN PATENT DOCUMENTS

CN 110201395 A 9/2019
CN 110201398 A 9/2019
(Continued)

OTHER PUBLICATIONS

Application No. 19761465.4 Extended European Search Report dated Sep. 1, 2021.
(Continued)

Primary Examiner — Omkar A Deodhar
Assistant Examiner — Shauna-Kay Hall
(74) Attorney, Agent, or Firm — Polsinelli LLP

(57) ABSTRACT

A plurality of game titles each associated with at least one tournament may be hosted on a gaming network platform. Real-time gameplay data in matches involving the plurality of game titles may be tracked. Each match may be associated with a stream. Memory may store stream parameters and metrics associated with the at least one tournament. A predefined achievement may be identified for the at least one tournament when the tracked gameplay data for a match meets the stored metrics. The identified achievement may be determined to meet the stream parameters. A notification may be provided to the user device that includes a link to a stream of the match.

19 Claims, 4 Drawing Sheets

(56) References Cited

U.S. PATENT DOCUMENTS

| | | |
|---|---|---|
| 8,025,572 B2 | 9/2011 | Spanton et al. |
| 8,187,104 B2 | 5/2012 | Pearce |
| 8,202,167 B2 | 6/2012 | Ackely et al. |
| 8,645,844 B1 | 2/2014 | Strobel et al. |
| 8,702,520 B2 * | 4/2014 | Seelig .................. G07F 17/32 463/16 |
| 9,216,356 B2 * | 12/2015 | Grier .................. G07F 17/3223 |
| 9,233,305 B2 | 1/2016 | Laakkonen et al. |
| 9,433,855 B1 | 9/2016 | Keeker et al. |
| 9,473,825 B2 | 10/2016 | Gossweiler et al. |
| 9,479,602 B1 | 10/2016 | Paradise et al. |
| 9,497,424 B2 | 11/2016 | Kosseifi et al. |
| 9,782,678 B2 | 10/2017 | Long et al. |
| 9,814,987 B1 | 11/2017 | Lawson |
| 9,860,477 B2 | 1/2018 | Kummer et al. |
| 9,871,997 B2 | 1/2018 | Kosseifi et al. |
| 9,968,856 B1 | 5/2018 | Ninoles et al. |
| 10,277,813 B1 | 4/2019 | Thomas et al. |
| 10,471,360 B2 | 11/2019 | Trombetta |
| 10,751,623 B2 | 8/2020 | Trombetta |
| 10,765,938 B2 | 9/2020 | Trombetta |
| 10,765,957 B2 | 9/2020 | Trombetta |
| 10,792,576 B2 | 10/2020 | Trombetta |
| 10,792,577 B2 | 10/2020 | Trombetta |
| 10,814,228 B2 | 10/2020 | Trombetta |
| 10,818,142 B2 | 10/2020 | Trombetta |
| 10,953,322 B2 | 3/2021 | Trombetta |
| 10,953,335 B2 | 3/2021 | Thielbar |
| 11,065,548 B2 | 7/2021 | Trombetta |
| 11,241,630 B2 | 2/2022 | Trombetta |
| 11,426,654 B2 | 8/2022 | Trombetta |
| 11,439,918 B2 | 9/2022 | Trombetta |
| 11,439,919 B2 | 9/2022 | Trombetta |
| 11,452,943 B2 | 9/2022 | Trombetta |
| 2002/0034980 A1 | 3/2002 | Lemmons et al. |
| 2002/0107040 A1 | 8/2002 | Crandall et al. |
| 2003/0177347 A1 | 9/2003 | Schneier et al. |
| 2003/0220143 A1 | 11/2003 | Shteyn et al. |
| 2004/0147306 A1 | 7/2004 | Randall et al. |
| 2004/0189701 A1 | 9/2004 | Badt |
| 2004/0257994 A1 | 12/2004 | Paskett et al. |
| 2004/0266535 A1 | 12/2004 | Reeves |
| 2005/0020359 A1 | 1/2005 | Ackely et al. |
| 2005/0026699 A1 | 2/2005 | Kinzer et al. |
| 2006/0105827 A1 | 5/2006 | Metzger et al. |
| 2006/0247060 A1 | 11/2006 | Hanson et al. |
| 2006/0287096 A1 | 12/2006 | O'Kelley et al. |
| 2007/0018952 A1 | 1/2007 | Arseneau et al. |
| 2007/0021058 A1 | 1/2007 | Aresneau et al. |
| 2007/0070914 A1 | 3/2007 | Abigail |
| 2007/0117617 A1 | 5/2007 | Spanton et al. |
| 2007/0117635 A1 | 5/2007 | Spanton et al. |
| 2007/0149288 A1 | 6/2007 | Nickell et al. |
| 2007/0191102 A1 * | 8/2007 | Coliz .................. A63F 13/12 463/42 |
| 2007/0248261 A1 | 10/2007 | Zhou et al. |
| 2008/0079752 A1 | 4/2008 | Gates et al. |
| 2008/0113815 A1 | 5/2008 | Weingardt et al. |
| 2008/0119286 A1 | 5/2008 | Brunstetter et al. |
| 2008/0200254 A1 | 8/2008 | Cayce et al. |
| 2009/0036214 A1 | 2/2009 | Dahl |
| 2009/0042646 A1 | 2/2009 | Sarkar et al. |
| 2009/0082110 A1 | 3/2009 | Relyea et al. |
| 2009/0144448 A1 | 6/2009 | Smith |
| 2009/0208181 A1 | 8/2009 | Cottrell |
| 2009/0225828 A1 | 9/2009 | Perlman et al. |
| 2009/0271821 A1 | 10/2009 | Zalewski |
| 2010/0099330 A1 | 4/2010 | Digiovanni |
| 2010/0100512 A1 | 4/2010 | Brodin et al. |
| 2010/0240443 A1 | 9/2010 | Baerlocher et al. |
| 2011/0092282 A1 | 4/2011 | Gary |
| 2011/0207523 A1 | 8/2011 | Filipour et al. |
| 2011/0250939 A1 | 10/2011 | Hobler |
| 2011/0263332 A1 | 10/2011 | Mizrachi |
| 2011/0263333 A1 | 10/2011 | Dokei et al. |
| 2011/0275431 A1 | 11/2011 | Hirzel et al. |
| 2012/0093481 A1 | 4/2012 | McDowell et al. |
| 2012/0142411 A1 | 6/2012 | Thompson et al. |
| 2012/0283017 A1 | 11/2012 | Ahiska et al. |
| 2013/0002949 A1 | 1/2013 | Raveendran et al. |
| 2013/0007013 A1 | 1/2013 | Geisner et al. |
| 2013/0083173 A1 | 4/2013 | Geisner et al. |
| 2013/0123019 A1 | 5/2013 | Sullivan et al. |
| 2013/0231189 A1 | 9/2013 | Beeler |
| 2013/0254680 A1 | 9/2013 | Buhr et al. |
| 2013/0296051 A1 | 11/2013 | Gault et al. |
| 2013/0324239 A1 | 12/2013 | Ur et al. |
| 2013/0331192 A1 * | 12/2013 | Betti .................. A63F 13/795 463/42 |
| 2014/0004951 A1 | 1/2014 | Kern et al. |
| 2014/0031121 A1 | 1/2014 | Kern et al. |
| 2014/0087846 A1 | 3/2014 | Bryan et al. |
| 2014/0087851 A1 | 3/2014 | Low et al. |
| 2014/0113718 A1 | 4/2014 | Norman et al. |
| 2014/0142921 A1 | 5/2014 | Gleadall et al. |
| 2014/0171039 A1 | 6/2014 | Bjontegard |
| 2014/0171182 A1 | 6/2014 | Versaci |
| 2014/0179440 A1 * | 6/2014 | Perry .................. A63F 13/87 463/42 |
| 2014/0228112 A1 | 8/2014 | Laakkonen et al. |
| 2014/0274307 A1 | 9/2014 | Gonzalez |
| 2014/0274368 A1 | 9/2014 | Cotter |
| 2014/0274370 A1 | 9/2014 | Shah |
| 2014/0297408 A1 | 10/2014 | Zabala |
| 2014/0331265 A1 | 11/2014 | Mozell et al. |
| 2015/0005052 A1 | 1/2015 | Harrington et al. |
| 2015/0011283 A1 | 1/2015 | Sanford et al. |
| 2015/0018990 A1 | 1/2015 | Shachar et al. |
| 2015/0024850 A1 | 1/2015 | Kokami et al. |
| 2015/0113548 A1 | 4/2015 | Stern et al. |
| 2015/0141140 A1 | 5/2015 | Lampe et al. |
| 2015/0238859 A1 | 8/2015 | Fear |
| 2015/0248792 A1 | 9/2015 | Abovitz et al. |
| 2015/0281029 A1 | 10/2015 | Callahan et al. |
| 2015/0348373 A1 | 12/2015 | Weingardt et al. |
| 2015/0375117 A1 | 12/2015 | Thompson et al. |
| 2016/0051895 A1 | 2/2016 | Hood |
| 2016/0193530 A1 | 7/2016 | Parker et al. |
| 2016/0214012 A1 | 7/2016 | Nishikawa |
| 2016/0243450 A1 | 8/2016 | Cotter |
| 2016/0253865 A1 | 9/2016 | Men et al. |
| 2016/0286244 A1 | 9/2016 | Chang et al. |
| 2016/0310843 A1 | 10/2016 | Webb |
| 2016/0365121 A1 | 12/2016 | DeCaprio |
| 2016/0373499 A1 | 12/2016 | Wagner et al. |
| 2017/0001111 A1 | 1/2017 | Willette et al. |
| 2017/0001112 A1 | 1/2017 | Gilmore et al. |
| 2017/0001122 A1 | 1/2017 | Leung et al. |
| 2017/0003740 A1 | 1/2017 | Verfaillie et al. |
| 2017/0003784 A1 | 1/2017 | Garg et al. |
| 2017/0006074 A1 | 1/2017 | Oates |
| 2017/0072324 A1 | 3/2017 | Navok et al. |
| 2017/0113143 A1 | 4/2017 | Marr |
| 2017/0157512 A1 | 6/2017 | Long et al. |
| 2017/0182426 A1 | 6/2017 | Loeb et al. |
| 2017/0209795 A1 | 7/2017 | Harvey et al. |
| 2017/0266549 A1 | 9/2017 | Paradise |
| 2017/0266552 A1 * | 9/2017 | Paradise ............... A63F 13/352 |
| 2017/0270751 A1 | 9/2017 | Paradise |
| 2017/0282075 A1 | 10/2017 | Michot et al. |
| 2017/0282082 A1 | 10/2017 | Hubbard |
| 2017/0304724 A1 | 10/2017 | Cotter |
| 2017/0332131 A1 | 11/2017 | Opsenica et al. |
| 2017/0354875 A1 | 12/2017 | Marks et al. |
| 2017/0374402 A1 | 12/2017 | Pogorelik et al. |
| 2018/0001199 A1 | 1/2018 | Gary |
| 2018/0077438 A1 | 3/2018 | Hensen et al. |
| 2018/0139257 A1 | 5/2018 | Ninoles et al. |
| 2018/0167656 A1 | 6/2018 | Ortiz et al. |
| 2018/0192144 A1 | 7/2018 | McElroy |
| 2018/0250598 A1 | 9/2018 | Trombetta |
| 2018/0367820 A1 | 12/2018 | Abulikemu |
| 2019/0099675 A1 | 4/2019 | Khan et al. |
| 2019/0102941 A1 | 4/2019 | Khan et al. |

(56) References Cited

U.S. PATENT DOCUMENTS

| | | |
|---|---|---|
| 2019/0118098 A1 | 4/2019 | Payzer et al. |
| 2019/0262720 A1 | 8/2019 | Trombetta |
| 2020/0179812 A1 | 6/2020 | Trombetta |
| 2020/0384364 A1 | 12/2020 | Trombetta |
| 2020/0398157 A1 | 12/2020 | Trombetta |
| 2020/0398169 A1 | 12/2020 | Trombetta |
| 2020/0406152 A1 | 12/2020 | Trombetta |
| 2021/0016190 A1 | 1/2021 | Trombetta |
| 2021/0043044 A1 | 2/2021 | Trombetta |
| 2021/0052982 A1 | 2/2021 | Trombetta |
| 2021/0178257 A1 | 6/2021 | Trombetta |
| 2021/0346809 A1 | 11/2021 | Trombetta |

FOREIGN PATENT DOCUMENTS

| | | |
|---|---|---|
| CN | 110201399 A | 9/2019 |
| CN | 110201401 A | 9/2019 |
| CN | 110201402 A | 9/2019 |
| CN | 110201404 A | 9/2019 |
| CN | 110573221 A | 12/2019 |
| CN | 111971097 A | 11/2020 |
| CN | 112423854 A | 2/2021 |
| CN | 112423855 A | 2/2021 |
| CN | 112543669 A | 3/2021 |
| EP | 3 058 996 | 8/2016 |
| EP | 3 758 814 | 1/2021 |
| EP | 3 758 816 | 1/2021 |
| EP | 3 758 818 | 1/2021 |
| EP | 3 758 819 | 1/2021 |
| EP | 3 758 821 | 1/2021 |
| EP | 3 759 930 | 1/2021 |
| EP | 3 759 934 | 1/2021 |
| EP | 3 758 820 | 2/2021 |
| JP | 2001-170360 | 6/2001 |
| JP | 2007-036830 | 2/2007 |
| JP | 2011-512172 | 4/2011 |
| JP | 2011-224204 | 11/2011 |
| JP | 2012-176127 | 9/2012 |
| JP | 2021-514748 | 6/2021 |
| JP | 2021-514749 | 6/2021 |
| JP | 2021-514750 | 6/2021 |
| JP | 2021-514751 | 6/2021 |
| JP | 2021-514752 | 6/2021 |
| JP | 2021-514753 | 6/2021 |
| JP | 2021-514754 | 6/2021 |
| JP | 2021-515485 | 6/2021 |
| JP | 2021-516087 | 7/2021 |
| JP | 2021-516088 | 7/2021 |
| KR | 10-2020-0126975 | 11/2020 |
| KR | 10-2020-0127169 | 11/2020 |
| KR | 10-2020-0127172 | 11/2020 |
| KR | 10-2020-0127173 | 11/2020 |
| KR | 10-2020-0128523 | 11/2020 |
| KR | 10-2020-0135946 | 12/2020 |
| KR | 10-2020-0136894 | 12/2020 |
| WO | WO 2010/030313 | 3/2010 |
| WO | WO 2014/109435 | 7/2014 |
| WO | WO 2016/048204 | 3/2016 |
| WO | WO 2016/201333 | 12/2016 |
| WO | WO 2017/004433 | 1/2017 |
| WO | WO 2018/004812 | 1/2018 |
| WO | WO 2018/160274 | 9/2018 |
| WO | WO 2018/165191 | 9/2018 |
| WO | WO 2019/168614 | 9/2019 |
| WO | WO 2019/168615 | 9/2019 |
| WO | WO 2019/168619 | 9/2019 |
| WO | WO 2019/168620 | 9/2019 |
| WO | WO 2019/168630 | 9/2019 |
| WO | WO 2019/168631 | 9/2019 |
| WO | WO 2019/168636 | 9/2019 |
| WO | WO 2019/168637 | 9/2019 |
| WO | WO 2019/168638 | 9/2019 |
| WO | WO 2019/168646 | 9/2019 |

OTHER PUBLICATIONS

Application No. 19761341.7 Extended European Search Report dated Aug. 17, 2021.
Application No. 19761523.0 Extended European Search Report dated Aug. 12, 2021.
Application No. 202027037125 First Examination Report dated Aug. 5, 2021.
Application No. 19760493.7 Extended European Search Report dated Sep. 2, 2021.
NAHL ranked #1 by The Junior Hockey News_North American Hockey League_NAHL.pdf, http://nahl.com/news/story.cfm?id=15090, Jul. 16, 2015 (Year: 2015).
Application No. 18763374.8, Extended European Search Report dated Dec. 14, 20.
PCT Application No. PCT/US2018/013378 International Preliminary Report On Patentability dated Sep. 3, 2019.
PCT Application No. PCT/US2018/013378 International Search Report and Written Opinion dated Mar. 8, 2018.
PCT Application No. PCT/US2018/021197 International Preliminary Report on Patentability dated Sep. 10, 2020.
PCT Application No. PCT/US2018/021197 International Search Report and Written Opinion dated May 30, 2018.
PCT Application No. PCT/US2019/015120 International Preliminary Report on Patentability dated Sep. 1, 2020.
PCT Application No. PCT/US2019/015120 International Search Report and Written Opinion dated Apr. 15, 2019.
PCT Application No. PCT/US2019/015273 International Preliminary Report on Patentability dated Sep. 1, 2020.
PCT Application No. PCT/US2019/015273 International Search Report and Written Opinion dated Apr. 23, 2019.
PCT Application No. PCT/US2019/015124 International Preliminary Report on Patentability dated Sep. 1, 2020.
PCT Application No. PCT/US2019/015124 International Search Report and Written Opinion dated Apr. 15, 2019.
PCT Application No. PCT/US2019/015275 International Preliminary Report on Patentability dated Sep. 1, 2020.
PCT Application No. PCT/US2019/015275 International Search Report and Written Opinion dated Apr. 23, 2019.
PCT Application No. PCT/US2019/016167 International Preliminary Report on Patentability dated Sep. 1, 2020.
PCT Application No. PCT/US2019/016167 International Search Report and Written Opinion dated Aug. 26, 2019.
PCT Application No. PCT/US2019/016180 International Preliminary Report on Patentability dated Sep. 1, 2020.
PCT Application No. PCT/US2019/016180 International Search Report and Written Opinion dated Apr. 23, 2019.
PCT Application No. PCT/US2019/016686 International Preliminary Report on Patentability dated Sep. 1, 2020.
PCT Application No. PCT/US2019/016686 International Search Report and Written Opinion dated Apr. 10, 2019.
PCT Application No. PCT/US2019/016698 International Preliminary Report on Patentability dated Sep. 1, 2020.
PCT Application No. PCT/US2019/016698 International Search Report and Written Opinion dated Apr. 11, 2019.
PCT Application No. PCT/US2019/016694 International Preliminary Report on Patentability dated Sep. 1, 2020.
PCT Application No. PCT/US2019/016694 International Search Report and Written Opinion dated Apr. 15, 2019.
PCT Application No. PCT/US2019/017100 International Preliminary Report on Patentability dated Sep. 1, 2020.
PCT Application No. PCT/US2019/017100 International Search Report and Written Opinion dated Apr. 17, 2019.
U.S. Appl. No. 15/448,356 Office Action dated Apr. 12, 2021.
U.S. Appl. No. 15/448,356 Final Office Action dated Oct. 21, 2020.
U.S. Appl. No. 15/448,356 Office Action dated May 28, 2020.
U.S. Appl. No. 15/448,356 Final Office Action dated Aug. 6, 2019.
U.S. Appl. No. 15/448,356 Office Action dated Jan. 8, 2019.
U.S. Appl. No. 15/448,356 Final Office Action dated Aug. 31, 2018.
U.S. Appl. No. 15/448,356 Office Action dated Mar. 5, 2018.
U.S. Appl. No. 15/450,602 Final Office Action dated Nov. 2, 2018.
U.S. Appl. No. 15/450,602 Office Action dated Apr. 6, 2018.
U.S. Appl. No. 16/681,477 Office Action dated Mar. 19, 2021.

(56) References Cited

OTHER PUBLICATIONS

U.S. Appl. No. 16/681,477 Final Office Action dated Nov. 30, 2020.
U.S. Appl. No. 16/681,477 Office Action dated Apr. 16, 2020.
U.S. Appl. No. 15/908,569 Office Action dated Mar. 27, 2020.
U.S. Appl. No. 15/908,569 Office Action dated Jun. 28, 2019.
U.S. Appl. No. 15/908,722 Office Action dated Oct. 30, 2020.
U.S. Appl. No. 15/908,722 Final Office Action dated Jun. 12, 2020.
U.S. Appl. No. 15/908,722 Office Action dated Jun. 28, 2019.
U.S. Appl. No. 15/908,635 Office Action dated Jun. 28, 2019.
U.S. Appl. No. 15/908,531 Office Action dated Jun. 28, 2019.
U.S. Appl. No. 15/908,657 Office Action dated Jun. 28, 2019.
U.S. Appl. No. 15/908,438 Office Action dated Oct. 3, 2019.
U.S. Appl. No. 15/908,345 Office Action dated Jan. 10, 2020.
U.S. Appl. No. 15/908,704 Final Office Action dated Jun. 12, 2020.
U.S. Appl. No. 15/908,704 Office Action dated Jun. 28, 2019.
U.S. Appl. No. 15/908,712 Office Action dated Aug. 8, 2019.
U.S. Appl. No. 15/908,707 Final Office Action dated Nov. 18, 2019.
U.S. Appl. No. 15/908,707 Office Action dated Jul. 17, 2019.
U.S. Appl. No. 17/380,373, Steven Trombetta, Statistical Driven Tournaments, filed Jul. 20, 2021.
Dietrich et al., Carlos; "Baseball4D: A tool for baseball game reconstruction & visualization", 2014 IEEE Conference on Visual Analytics Science and Technology (VAST), IEEE, Oct. 25, 2014, pp. 23-32.
Application No. 19760732.8 Extended European Search Report dated Oct. 1, 2021.
Application No. 10-2019-7029332 Office Action dated Oct. 19, 2021.
Application No. 19760888.8 Extended European Search Report dated Oct. 27, 2021.
Application No. 19760016.6 Extended European Search Report dated Oct. 8, 2021.
Application No. 19759929.3 Extended European Search Report dated Oct. 25, 2021.
Application No. 19760240.2 Extended European Search Report dated Feb. 2, 2022.
Application No. 19760240.2 Partial Supplementary European Search Report dated Oct. 13, 2021.
Application No. 19760890.4 Extended European Search Report dated Nov. 10, 2021.
Application No. 202027037244 First Examination Report dated Dec. 15, 2021.
U.S. Appl. No. 17/014,149 Office Action dated Sep. 29, 2021.
U.S. Appl. No. 17/014,182 Office Action dated Sep. 29, 2021.
U.S. Appl. No. 17/000,841 Office Action dated Sep. 20, 2021.
U.S. Appl. No. 17/015,845 Office Action dated Oct. 6, 2021.
U.S. Appl. No. 17/060,458 Office Action dated Oct. 6, 2021.
U.S. Appl. No. 15/448,356 Final Office Action dated Jul. 28, 2021.
PCT Application No. PCT/U.S. Pat. No. 22224943 International Search Report and Written Opinion dated Jul. 28, 2022.
U.S. Appl. No. 17/380,373 Office Action dated Aug. 5, 2022.
U.S. Appl. No. 17/362,416 Office Action dated Sep. 6, 2022.
U.S. Appl. No. 17/080,551 Office Action dated May 12, 2022.
U.S. Appl. No. 17/188,544 Office Action dated Jun. 27, 2022.
U.S. Appl. No. 17/080,580 Office Action dated May 26, 2022.
Racing game video curation application "Motor Tube" starts delivering its service, 4Gamer.net [online], Nov. 17, 2016 [retrieved on: Nov. 25, 2022].
Support is announced for battle game video curation application "Kak-gei Tube", MSY [onlin], Jul. 14, 2016 [retrieved on: Nov. 25, 2022].
JP Application No. 2020-545251 Non-Final Notification of Reasons for Refusal dated Oct. 11, 2022.
JP Application No. 2020-545273 Non-Final Notification of Reasons for Refusal dated Oct. 18, 2022.
JP Application No. 2020-55313 Non-Final Notification of Reasons for Refusal dated Dec. 6, 2022.
JP Application No. 2020-545317 Non-Final Notification of Reasons for Refusal dated Nov. 15, 2022.
JP Application No. 2020-545263 Non-Final Notification of Reasons for Refusal dated Dec. 6, 2022.
JP Application No. 2020-545320 Notification of Reasons for Refusal dated Nov. 15, 2022.
JP Application No. 2020-545275 Non-Final Notification of Reasons for Refusal dated Oct. 18, 2022.
JP Application No. 2020-545245 Non-Final Notification of Reason(s) for Refusal dated Oct. 4, 2022.

\* cited by examiner

ONLINE TOURNAMENT INTEGRATION

CROSS-REFERENCE TO RELATED APPLICATION

The present application is a continuation and claims the priority benefit of U.S. patent application Ser. No. 15/908, 569 filed Feb. 28, 2018, now U.S. Pat. No. 10,953,335, which is incorporated herein by reference in its entirety.

BACKGROUND OF THE INVENTION

1. Field of the Invention

The present invention generally relates to game tournaments. More specifically, the present invention relates to online game tournament integration.

2. Description of the Related Art

There are presently a wide variety of online games played in a variety of different modes. Some games are played head-to-head against one or more player, while others are played in teams, which may or may not be against another team. The ability to compete against other players and/or teams lends itself to tournament-style play. Similar to real-world tournaments, such a tournament for online games may involve setting up, identifying qualified players, ranking or seeding players, bracketing or matching each round, scheduling competitions, resolving disputes, broadcasting the tournament competitions, results verification, and timely communication of tournament data.

Many game titles do not provide native support for tournament-style play, however. As such, current online tournaments may be run by end-users or third parties whose systems are not integrated into the game and which therefore lack visibility and insight into in-game and tournament activities. Such online tournaments may therefore experience significant barriers to entry, as well as face problems in implementation. Such problems may lessen enjoyment and other benefits not only for the players, but also for spectators, commentators and other streamers, developers, sponsors, etc. As a result, tournaments may tend to be run by third parties for popular titles with numerous expert players. Such tournaments may exclude or at least be discouraging to novice players, as well as fail to offer less popular game titles.

One problem in the early stages of holding a tournament may involve skills evaluation. Tournaments are more competitive and therefore successful, for example, when disparities in skill level are not too great. Expert players may find it boring to play inexperienced players, while the inexperienced players may find it demoralizing to play expert players. Further, such games as played between players of wide disparate skill level are often short and have predictable outcomes, leading spectators to be bored as well.

Spectators may further face difficulties in identifying competitions that are part of a tournament, as well as obtaining tournament-related information. A spectator of games may avail themselves of a stream from a variety of online media outlets (e.g., Twitch). Such outlets may publish games from numerous players (including players who are not participating in tournaments), however, making it difficult or at least inconvenient for the spectator to identify which games are part of a particular tournament of interest. Such inconvenience risks loss of an interested audience of spectators.

The ability to attract, retain, and encourage repeat spectators is especially important to professional and semi-professional players whose gameplay may be sponsored. In addition to players who may be sponsored, commentators and other individuals who may seek to provide content related to tournaments may also face various difficulties in obtaining tournament data.

There is, therefore, a need in the art for improved systems and methods for online tournament integration.

SUMMARY OF THE CLAIMED INVENTION

Embodiments of the present invention allow for online tournament integration. A plurality of game titles each associated with at least one tournament may be hosted on a gaming network platform. Real-time gameplay data in matches involving the plurality of game titles may be tracked. Each match may be associated with a stream. Memory may store stream parameters and metrics associated with the at least one tournament. A predefined achievement may be identified for the at least one tournament when the tracked gameplay data for a match meets the stored metrics. The identified achievement may be determined to meet the stream parameters. A notification may be provided to the user device that includes a link to a stream of the match.

Various embodiments may include systems for online tournament integration. Such systems may include at least one game network server that hosts a plurality of game titles each associated with at least one tournament and tracks real-time gameplay data in matches involving the plurality of game titles and associated with a stream. Systems may further include at least one tournament server that stores one or more stream parameters and one or more metrics associated with the at least one tournament, identifies a predefined achievement for the at least one tournament when the tracked gameplay data for a match meets the stored metrics, determines that the identified achievement meets the stream parameters, and provides a notification to the user device, the notification including a link to a stream of the match.

Further embodiments may include methods for online tournament integration. Such methods may include hosting a plurality of game titles each associated with at least one tournament, tracking real-time gameplay data in matches involving the plurality of game titles and associated with a stream, storing one or more stream parameters and one or more metrics associated with the at least one tournament, identifying a predefined achievement for the at least one tournament when the tracked gameplay data for a match meets the stored metrics, determining that the identified achievement meets the stream parameters, and providing a notification to the user device, the notification including a link to a stream of the match.

Yet further embodiments may include non-transitory computer-readable storage media having embodied thereon programs executable to perform such methods as described above.

DETAILED DESCRIPTION

Embodiments of the present invention allow for online tournament integration. A plurality of game titles each associated with at least one tournament may be hosted on a gaming network platform. Real-time gameplay data in matches involving the plurality of game titles may be tracked. Each match may be associated with a stream. Memory may store stream parameters and metrics associated with the at least one tournament. A predefined achievement may be identified for the at least one tournament when the tracked gameplay data for a match meets the stored metrics. The identified achievement may be determined to meet the stream parameters. A notification may be provided to the user device that includes a link to a stream of the match.

Such online tournament integration may allow for tournaments to be held by individuals, developers, and other vendors. Providing online tournament integration may involve simple and generic tools for setting up and running a tournament at the platform level, while providing visibility into specific games. As such, a user may use such tools to set up a small tournament with friends who are casual players, while an event planner may use such tools to run a large tournament with numerous participants, complex rules, and involving even a plurality of game titles.

Figure 1:
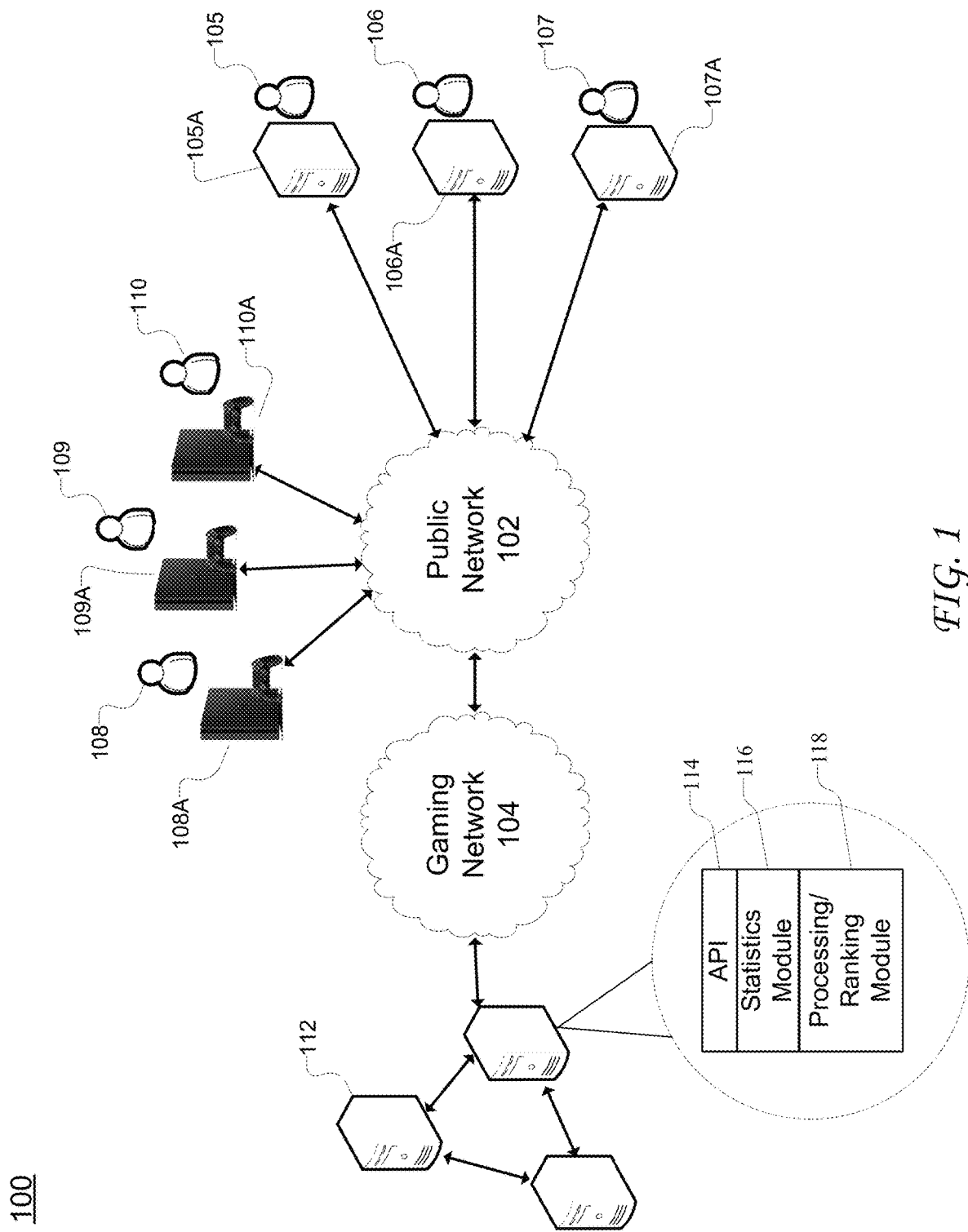
FIG. 1 an exemplary network environment in which systems for online tournament integration may be implemented.

FIG. 1 illustrates an exemplary network environment 100 in which a system for online tournament integration may be implemented. Network environment 100 includes public network 102, which can include one or more private networks, such as, a local area network (LAN), a wide area network (WAN), or a network of public/private networks, such as the Internet. The Internet is a broad network of interconnected computers and servers allowing for the transmission and exchange of Internet Protocol (IP) data between user devices connected through a network service provider. Examples of network service providers are the public switched telephone network, a cable service provider, a provider of digital subscriber line (DSL) services, or a satellite service provider. Public network 102 allows for communication between the various components of network environment 100. Public network 102 is communicatively coupled to gaming network 104, which may further provide a network of computing resources configured for implementing online tournament system 112.

As illustrated, players 108, 109, and 110 are permitted access to online tournament system 112 using respective client devices (e.g., 108A, 109A, and 110A). Although client devices 108A, 109A, and 110A, are depicted as game console devices, it is understood that the client devices can include various types of processor-based systems, including but not limited to: personal computing devices, smartphones, tablets, other portable gaming devices, and the like. Such client devices 108A-110A may also be configured to access data from other storage media, such as memory cards or disk drives as may be appropriate in the case of downloaded services. Client devices 108A-110A may include standard hardware computing components such as network and media interfaces, non-transitory computer-readable storage (memory), and processors for executing instructions that may be stored in memory. Example of hardware systems that can be used to implement the client device are discussed in further detail below with respect to FIG. 4.

Similarly, developers (e.g., 105, 106 and 107), are permitted access to online tournament system 112 via their respective computing systems (e.g., 105A, 106A, and 107A). Developer computing systems 105A-107A may include any type of server or other computing device as is known in the art, including standard hardware computing components such as network and media interfaces, non-transitory computer-readable storage (memory), and processors for executing instructions or accessing information that may be stored in memory. The functionalities of multiple servers may be integrated into a single server. Any of the aforementioned servers (or an integrated server) may take on certain client-side, cache, or proxy server characteristics. These characteristics may depend on the particular network placement of the server or certain configurations of the server. It is understood that a greater (or fewer) number of players and/or developers can be engaged with environment 100, without departing from the scope of the disclosed technology.

The players 108-110 may be registered with a user account associated with gaming network 104. Such user accounts may allow the user to access and play a variety of media titles on the gaming network platform. Gaming network 104 may further provides its registered users with options for verified accounts (e.g., for professional, semi-pro, or other celebrity users), team management, community tools, events tracking, social tools (e.g., friends lists), following other accounts, instant messaging, browsing live and archived streams, and other features related to playing or spectating games on the platform.

Gaming network 104 may be integrated with online tournament system 112 so as to allow for automatic communication of gameplay data. The gameplay data can be received by online tournament system 112, for example, using an application programming interface (API), such as API 114. Subsequently, the gameplay data can be passed from API 114 to statistics module 116 for use in player analysis. In a similar manner, game-play statistics can be collected by API 114 and passed to statistics module 116. Depending on implementation, gameplay statistics can be collected via active monitoring of an online game environment, or received from one or more external systems, for example, as part of a game performance data set that includes information describing individual player performance for one or more game titles and/or genre categories.

Online tournament system 112 may create and support tournament-style competitions between various players 108 (or teams of players) and for various game titles, as well as support related activities for streamers and spectators. A tournament may be created by a developer 106, player 108, or third party organizer (not pictured) by submitting a request over public network 102 and gaming network 104 to online tournament system 112. A tournament may be organized, for example, in conjunction with the new game title release. Such a tournament may specify that the tournament season starts one month after the game title release and last for three months. Players who register may be ranked during the season, and such rankings may be used to determine seeding and bracketing during the tournament. Such rankings may carry over to a certain extent between different tournament seasons, but may also be adjusted based on certain factors (e.g., lack of activity). In some embodiments, players that have played in previous seasons may enter the following season at a higher tier than brand new players.

Further, the highest-ranked players may be dropped down a level so that they have room improve throughout the season.

A tournament may be customized in accordance with certain specified parameters, such as the game title(s) to be played, type of tournament (e.g., single elimination, double elimination, Swiss-system, round robin, deathmatch, racing), bracket types, match types, timeframe, a number of participants, and requirements or parameters for participating, match duration, level of competition, specific maps to be played, and/or strategies to be implemented. In some embodiments, the tournament organizer may further specify how the players may qualify, as well as how gameplay may be evaluated. For example, the tournament organizer may specify one or more in-game conditions or actions that increase or decrease the player's rankings with respect to other players. In some instances, a player access list can be used to specify specific players or types of players to be included (or excluded) from competition in a given tournament. Some tournaments may be available to high-ranking players only, while other tournaments may be organized specifically for casual or new players.

The online tournament system 112 may further provide a way for players having a user account in the gaming network platform to register for tournament play. Because the registering player may already have a user account, registration for tournament play may involve linking or otherwise accessing the user account information for use in tournament registration, as well as for associated qualification verification, recruiting and invitations, team-building, notifications, reminders, match scheduling and check-ins, updated brackets, results verification, real-time reporting, dispute management, and broadcast/stream production. A player account may be associated with a group of friends, for example, which may be a basis for sending out invitations to participate in the tournament, team-building, or organizing spectator watch parties.

For game titles that may be played in teams, a team may be associated with a team account or profile that includes such data for use by online tournament system 112. Such a team profile may be linked to the individual team member profiles. The online tournament system 112 may provide team management tools for use in scheduling and otherwise managing tournament participation by the team.

Spectator tools may also be provided to enable users to discover, tune in, watch, and interact in relation to the tournament. Discovery may involve providing certain kinds of information (e.g., from player or team profiles) so that a would-be spectator may determine whether a player, team, match, tournament, commentator, or other content producer/streamer may be of interest. A spectator—who may have their own user account—may further subscribe or follow a player, team, game title, or tournament of interest. Such a subscriber may therefore be provided with automatic notifications based on certain events or activities (e.g., scores, lead changes, game results, standings after each round, updated brackets) detected on the platform as being related to the subject of interest.

In addition to the features discussed above, online tournament system 112 may further use such data from user and team accounts and profiles to track tournament progress, update brackets and leaderboards, schedule matches, and perform other tournament-related functions. Conversely, information regarding each individual player's or team's progress or activities within the tournament may be automatically populated to the respective player or team profile. For example, a player profile may be tagged or include some other indicator that the player is participating in a particular tournament, what ranking or seeding the player is assigned, schedule of tournament matches, opponents (and associated rankings), real-time tournament data related to the player, links to streams of previously played tournament matches, links to active tournament matches, information regarding future tournament matches, etc.

Moreover, a spectator looking to observe a particular player may be linked to information regarding tournament streams involving the player of interest, as well as other tournament information regarding the player. In addition, a spectator looking specifically to observe tournament matches may be linked to active tournament streams of ongoing matches, as well as be provided with the latest updates regarding the tournament.

Because the metrics that are used to evaluate player performance for a particular game can vary widely between game title and type, the ability to rank and seed players require consideration of certain metrics. Such metrics may be converted from data generated in existing game titles or may be tracked at the platform during certain specified gameplay modes. Some legacy game titles may have their own ranking systems, which a tournament organizer may or may not rely on. A tournament organizer may elect to convert some or all of the existing ranking systems for use in tournament play. Creation of a tournament and corresponding parameters can be managed at the platform level, for example, by one or more of players 108-110. That is, individual players, player collectives, or other parties can specify the game-performance attributes desired for structuring the tournament.

To convert a legacy game title, a conversion key—provided by the game title developer or another party—may be applied to specific game-performance attributes so as to evaluate different players' performance relating to the game title in a standardized way. For example, the conversion key may extract and evaluate certain metrics (e.g., number of points scored, number of points allowed, number of kills, race times) with appropriate weights applied to each metric. Legacy game titles that rank each user using basic points-based systems may be mapped directly via percentiles of the ranked players.

Such standardization further allows for an objective comparison of skill level, which may provide a basis for rankings, seedings, and matchmaking. Different genres of games—and different roles within each game—may involve different standards. Team-based gameplay, for example, may involve teammates with different types of skill sets (e.g., different weaponry, resources, in-game abilities, powers, etc.). As such, the game play of different team members may be evaluated in accordance with the different standards despite playing in the same game title.

In some embodiments, a game developer may elect to take advantage of the tournament tools provided by online tournament system 112 to support tournaments for a certain game title. Such game titles may therefore offer a tournament mode in which gameplay is associated with an identified tournament, whether for qualification, participation, or reporting. A player may elect to play in other modes, for example, while learning to play a new game title, play in a different role/character, practicing certain skills, casual games, or other types of game that the player may not want to be counted or considered with respect to a tournament.

Tournament mode may also be used to qualify and be ranked or seeded for a tournament. As noted above, a tournament organizer may specify certain requirements, qualifications, or grouping criteria (e.g., for different skill levels). To qualify to play in an expert-level tournament, a player must be ranked at a certain level (e.g., top 50) among all players on the gaming network 104 platform that have registered with the tournament. A player seeking to qualify at that level may select tournament mode after training in practice mode, and points or other metrics achieved during a game played in tournament mode may therefore be considered in ranking that player. In some cases, metrics may be weighted based on various factors, including degree of difficulty, expertise or ranking of the opponent(s) played, how recent the achievements were, context of game (e.g., qualifying round vs. finals), etc. During a qualification period, for example, online tournament system 112 may evaluate the game performance attributes, and gameplay statistics to determine a skill level for each player in a given league, e.g., using processing/ranking module 118. Determinations of skill level can vary depending upon the specified game performance attributes, and can vary between game titles, and/or game genres. By way of example, skill level for a given player can be based on one or more of: collected points, a number of wins/losses, total game time, achieve difficulty level, and/or a number of "kills," etc. Because game play occurs on the gaming network 104 platform, online tournament system 112 may obtain such results automatically and in real time, thereby by allowing for metrics generation, evaluation, and use in updating rankings, achievements designations, and leaderboards.

In some aspects, players registered for a given tournament can be ranked into multiple categories or tiers of skill level. For example, players may be categorized into a platinum tier for being in the top 2% of players, into a gold tier for being in the next 20% of players, into a silver tier for being in the next 28% of players, and into a bronze tier designated for the last 32%. Such tiers may further be subdivided as needed into + or − subdivisions. A player categorized as gold + may be close to being moved into the platinum tier, for example, while a player categorized as gold − may be close to falling into the silver tier.

Designations of achievement or skill level can be provided based on the overall ranking of a player or group of players. For example, digital badges, trophies, or medals can be provided to the top-ranked player (or player team), and published on an associated player (or team) profile. Such designations may be awarded as to a current season and remain visible in future seasons. Different designations may be provided for different game titles, different combinations of achievements, overall ratings, etc. Not only can such designations and tier levels serve as the basis for matching competitors, but such indicators may be searched by spectators looking to watch players of a certain level in a certain game title. Various search and sorting options may be provided (e.g., game title, ranking, stream parameters) so that players or potential spectators may filter through the available game streams, players, teams, tournaments, etc. to find other players of interest. A player may wish to find a similarly-skilled practice sparring partner, for example, or a teammate with complementary skills. Such spectators may choose to follow such players, for example, and request notifications, reminders, and schedules relating to matches involving the player(s) of interest. In some embodiments, such designations may be made available through other outlets (e.g., stream sources such as Twitch) for searching and filtering based on a standardized skill evaluation system.

Different ranking systems may be available for different game titles. Moreover, different ranking systems may be available for tournaments. A tournament may involve multiple game titles, for example, and as such, a ranking system may combine and/or weight different individual rankings within the game titles as desired by the tournament organizer. An overall ranking for any combination of games played on the platform may also be available. As such, a player may distinguish themselves as a skilled player not only in one or a few game titles (or even a game family or genre), but within multiple different types of games.

Depending on the number of registrants, a tournament may hold a set of qualifying rounds to reduce the number of registrants to a desired number. Alternatively, the tournament organizer may elect to have an invitation-based system based on rankings and any other factors deemed appropriate.

Moreover, because the online tournament system 112 is in communication with gaming network 104, the online tournament system 112 may receive and analyze game data in real-time. As such, online tournament system 112 may detect when a match has started, when the match is particularly active or competitive, and other in-game events. For example, certain in-game events may be associated with certain game data or metrics. Use of certain weaponry, exhibition of certain character moves or maneuvers, scoring in a certain amount or pattern, etc., may be indicative of an unusual or otherwise notable in-game event. As such, screenshots or video may be captured regarding such events and published with links that can take a spectator to the stream, whether at the beginning of the match or directly to illustrated point of interest. Such links may be accessed in real-time (e.g., as the match is occurring) or in association with an archived stream. In some embodiments, such links may be published on the gaming network 104 platform (e.g., landing pages, leaderboards, communities, forums, user profiles, team profiles, tournament profiles, bookmarks) or on sites associated with the player, team, developer, tournament organizer, broadcaster, or other content producer or streamer.

The identification of unusual, interesting, or otherwise significant events may also allow for advertising, promotion, discovery, and related functions. As such, notifications, reminders, video clips, screenshots, and other data may also be generated and provided to other parties, players, spectators, and potential spectators in real-time regarding such events. Such data may also support commentators and third-party broadcasters/streamers for use in producing their respective content streams.

Figure 2:
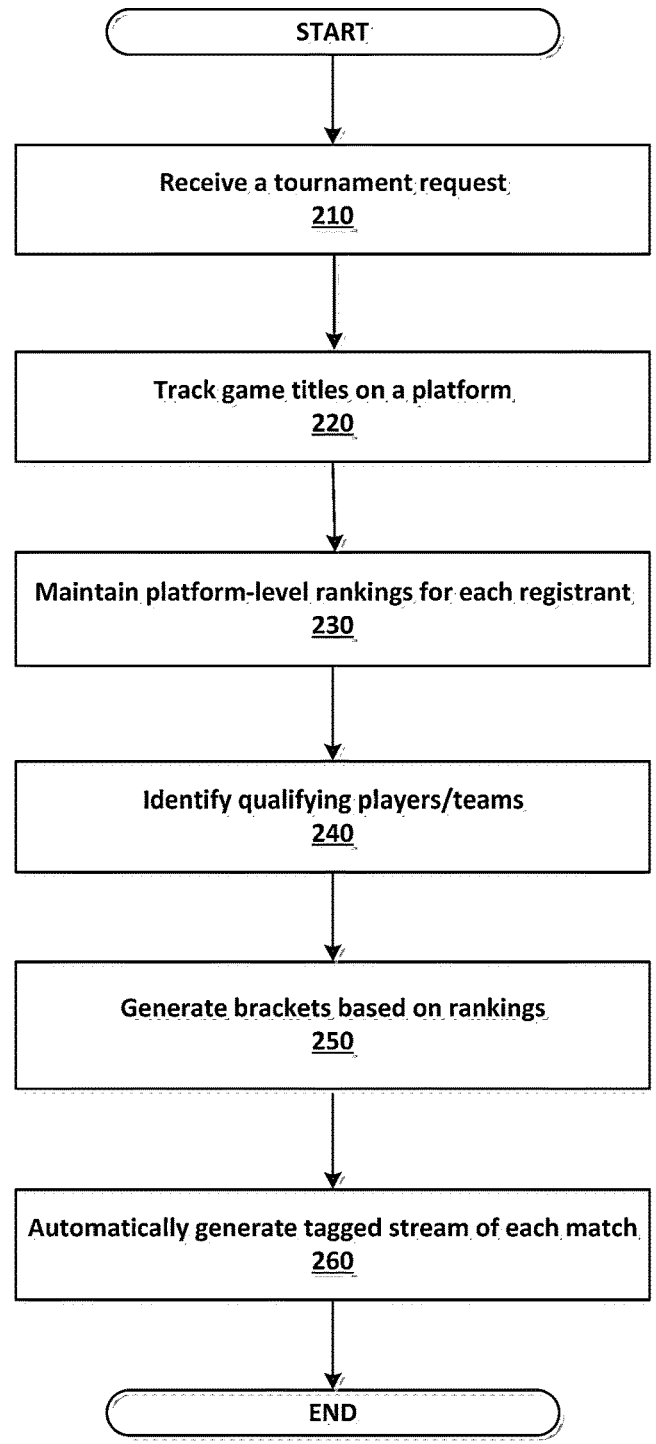
FIG. 2 is a flowchart illustrating an exemplary method for online tournament integration.
Figure 3:
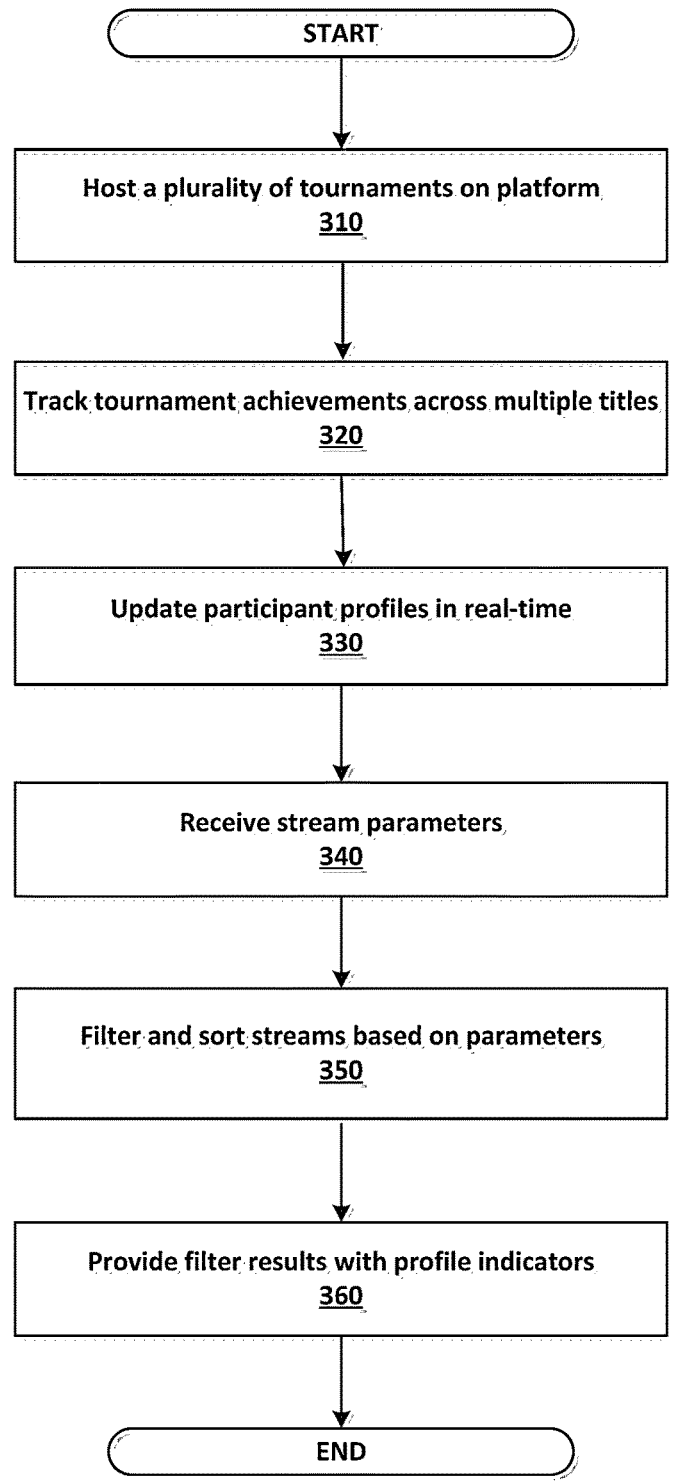
FIG. 3 is a flowchart illustrating another exemplary method for online tournament integration.

FIGS. 2 and 3 respectively illustrate methods 200 and 300 for providing online tournament integration. The methods 200 and 300 of FIGS. 2 and 3 may be embodied as executable instructions in a non-transitory computer readable storage medium including but not limited to a CD, DVD, or non-volatile memory such as a hard drive. The instructions of the storage medium may be executed by a processor (or processors) to cause various hardware components of a computing device hosting or otherwise accessing the storage medium to effectuate the method. The steps identified in FIGS. 2 and 3 (and the order thereof) are exemplary and may include various alternatives, equivalents, or derivations thereof including but not limited to the order of execution of the same.

FIG. 2 is a flowchart illustrating an exemplary method 200 for online tournament integration. In method 200 of FIG. 2, a tournament request may be received. Gameplay relating to one or more game titles on the platform may be tracked, and platform-level rankings may be maintained for each tournament registrant (individual player and/or team). Qualifying registrants may be identified and brackets generated based on such rankings. For each match in the tournament, a stream may be generated automatically and associated with the respective players/teams participating therein.

In step 210, a tournament request may be received by online tournament system 112. As noted herein, the tournament requested may be small (e.g., requested by an individual user for a small group of friends) or large (e.g., massive multiplayer game titles with numerous participants). A tournament request may involve one or more game titles available through gaming network 104, as well as may specify a variety of parameters for qualifying, rankings, scheduling, etc. A player having a user account (or team having a team account) on gaming network 104 may register and have their data automatically shared with online tournament system 112 for use in facilitating registration, rankings, promotions, awards, searches, and other tournament-related activities. The tournament request may further explain the ranking system, which may include any combination of gameplay metrics used to evaluate each registrant in a standardized way.

In step 220, gameplay may be tracked for the game titles specified in the tournament request. As described above, a player may switch between different modes of game play. While gameplay during practice mode may be excluded from consideration with respect to towards tournament qualification, gameplay during a tournament mode may be considered and its metrics counted toward tournament-related rankings. The particular metrics being tracked and evaluated may differ by game title and by parameters specified by the tournament organizer. Further, the parameters may be weighted differently based on preferences specified by the tournament organizer as well.

In step 230, the relevant gameplay by all tournament registrants may therefore be ranked in accordance with the tournament-specific parameters. One or more leaderboards (e.g., individual metrics or combined metrics) may be maintained throughout the qualification phase and tournament. Designations indicative of high metrics may also be populated to the profile of the player or team that achieved such metrics. Such designations may include badges, trophies, titles, etc., and may be awarded periodically (e.g., highest scorer during a specified week) or for an overall tournament.

In step 240, the qualification phase may end with a number of registered players (or teams). If the number is higher than the number specified by the tournament organizer, one or more initial rounds may be held to determine which players/teams advance to the official tournament rounds. Some embodiments may allow the top players to advance automatically (e.g., a bye), while lower-ranked players may be required to compete in the initial rounds in order to continue to play in the tournament.

In step 250, brackets may be assigned. In some embodiments, brackets may be assigned based on rankings. The type of brackets may depend on the type of matches (e.g., head-to-head or multiplayer) being played. Further, rankings may also be adjusted during the tournament. As such, a player or team that has a low ranking at the beginning of the tournament may nevertheless advance and be given a top seed based on high-level tournament play. As noted above, because the tournament games are played in gaming network 104, the gameplay data therein may be automatically evaluated and published to various profiles, landing pages, and other designated outlets and recipients.

In step 260, a broadcast stream may be automatically generated for each tournament game and published on the gaming network 104 platform in any of the various pages and locations discussed herein. The broadcast stream may further be tagged with any of the relevant data associated therewith, including participating players, teams, game titles, respective designations (e.g., involving a top-ranked player), and any in-game events that may be determined to be of interest.

FIG. 3 is a flowchart illustrating another exemplary method 300 for online tournament integration. In method 300 of FIG. 3, a plurality of tournaments may be hosted on a platform. Tournament achievements may be tracked, which may include achievements by multiple players and teams in multiple game titles. Participant profiles—whether individual player, team, or both—may be updated in real-time to indicate not only that the participant is currently playing a match against one or more other participants, but also notable in-game events (e.g., scores, lead changes, kills, certain moves or maneuvers, exercise of certain powers). A spectator or prospective spectator may indicate certain parameters of interest (e.g., certain game titles, certain players, skill level of interest). The available tournament streams may be filtered and sorted based on the indicated parameters, and the filtered and sorted results may be displayed in conjunction with any applicable designations of notability.

In step 310, multiple tournaments may be hosted on the gaming network 104 platform. Such tournaments may be organized and held as described with respect to the method illustrated in FIG. 2. Such tournaments may involve any combination of game titles and players/teams as specified by the respective tournament organizers.

In step 320, any achievements occurring during the tournaments may be tracked in real-time. Because the games or matches are being played on the gaming network 104 platform, the respective gameplay data may be evaluated in real-time to identify noteworthy in-game events, which may not only include scores or lead changes, but also unusual movement combinations, notable speeds, notable kills, etc.

In step 330, participant profiles may be updated in real-time regarding such achievements, so as to notify spectators, subscribers, developers, sponsors, broadcasters, commentators, upcoming competitors, etc. Such achievements may also be published or otherwise pushed out through various channels (e.g., Twitch) that may track such players, teams, or matches.

In step 340, stream parameters may be specified by a party interested in the tournament. A potential spectator, for example, may be a user of gaming network 104 who may have subscribed to watch matches involving certain tournament participants (players or teams). As such, any streams involving the subjects of interest may be filtered and sorted based on the parameters. Sorting may further be based on current rankings, current participation in a match, notable in-game events, etc., or any other factor of interest that may be specified by a spectator.

In step 350, the available streams may be filtered and sorted in accordance with the parameters specified in step 340. In some instances, the available streams may include archived but unwatched streams, as well as live streams.

In step 360, the filtered and sorted results (e.g., a list of streams) may be displayed to the requesting party. The bases for such filtering and sorting—which may be associated with the notability designations discussed herein—may also be displayed in conjunction with the results, thereby allowing the party (e.g., spectator) to jump not only to a stream of interest, but directly to a notable event depicted within the stream.

Figure 4:
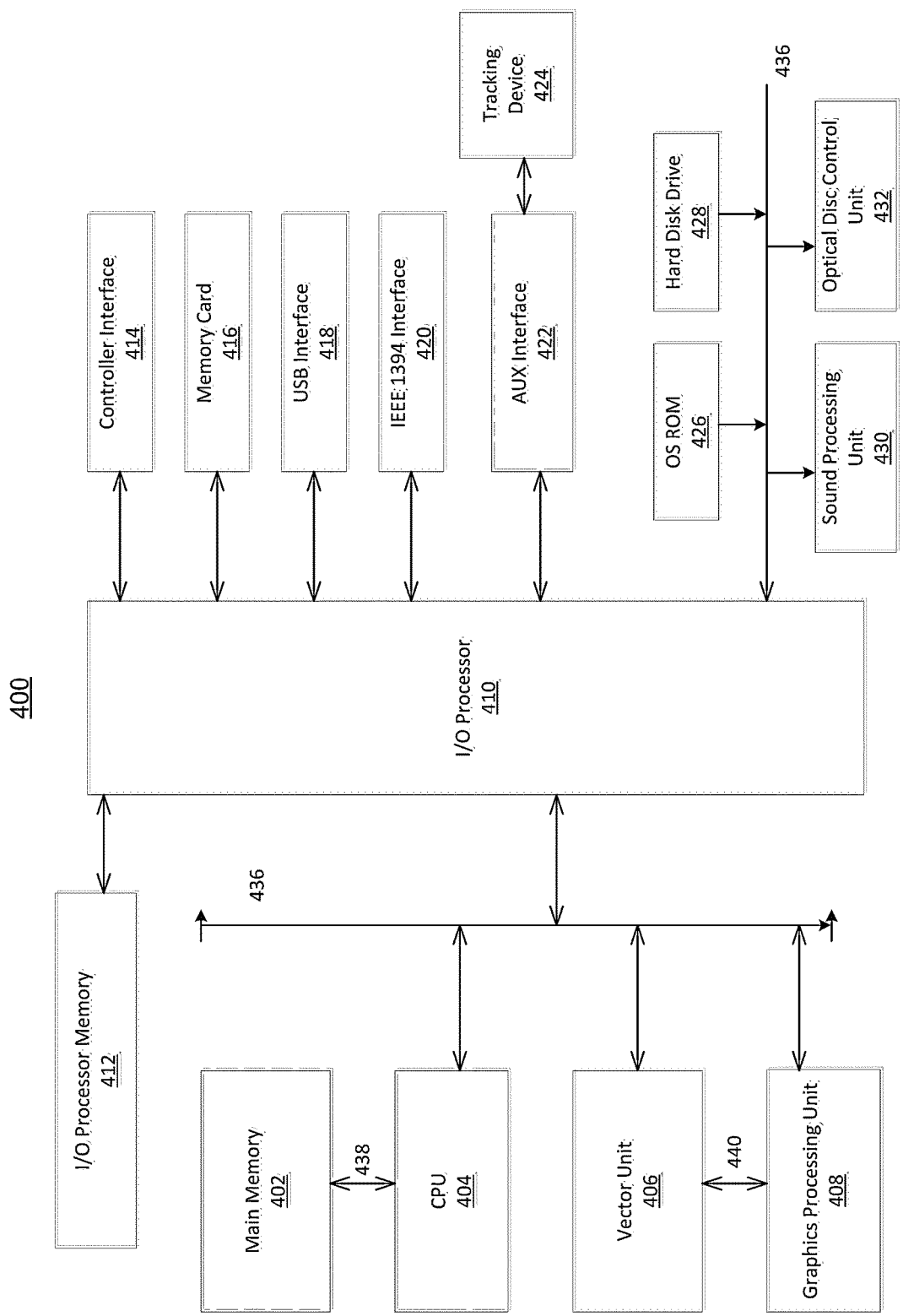
FIG. 4 illustrates an example of an electronic system with which some aspects of the subject technology can be implemented.

FIG. 4 is an exemplary user device 400. User device 400 (e.g., desktop, laptop, tablet, mobile device, console gaming system) is a device that the user can utilize to facilitate carrying out features of the present invention pertaining to the viewing of third party content.

The user device 400 may include various elements as illustrated in FIG. 4. It should be noted that the elements are exemplary and that other embodiments may incorporate more or less than the elements illustrated. With reference to FIG. 4, the user device 400 includes a main memory 402, a central processing unit (CPU) 404, at least one vector unit 406, a graphics processing unit 408, an input/output (I/O) processor 410, an I/O processor memory 412, a controller interface 414, a memory card 416, a Universal Serial Bus (USB) interface 418, and an IEEE 1394 interface 420, an auxiliary (AUX) interface 422 for connecting a tracking device 424, although other bus standards and interfaces may be utilized. The user device 400 further includes an operating system read-only memory (OS ROM) 426, a sound processing unit 428, an optical disc control unit 430, and a hard disc drive 432, which are connected via a bus 434 to the I/O processor 410. The user device 400 further includes at least one tracking device 424.

The tracking device 424 may be a camera, which includes eye-tracking capabilities. The camera may be integrated into or attached as a peripheral device to user device 400. In typical eye-tracking devices, infrared non-collimated light is reflected from the eye and sensed by a camera or optical sensor. The information is then analyzed to extract eye rotation from changes in reflections. Camera-based trackers focus on one or both eyes and record their movement as the viewer looks at some type of stimulus. Camera-based eye trackers use the center of the pupil and light to create corneal reflections (CRs). The vector between the pupil center and the CR can be used to compute the point of regard on surface or the gaze direction. A simple calibration procedure of the viewer is usually needed before using the eye tracker.

Alternatively, more sensitive trackers use reflections from the front of the cornea and that back of the lens of the eye as features to track over time. Even more sensitive trackers image features from inside the eye, including retinal blood vessels, and follow these features as the eye rotates.

Most eye tracking devices use a sampling rate of at least 30 Hz, although 50/60 Hz is most common. Some tracking devises run as high as 1250 Hz, which is needed to capture detail of very rapid eye movement.

A range camera may instead be used with the present invention to capture gestures made by the user and is capable of facial recognition. A range camera is typically used to capture and interpret specific gestures, which allows a hands-free control of an entertainment system. This technology may use an infrared projector, a camera, a depth sensor, and a microchip to track the movement of objects and individuals in three dimensions. This user device may also employ a variant of image-based three-dimensional reconstruction.

The tracking device 424 may include a microphone integrated into or attached as a peripheral device to user device 400 that captures voice data. The microphone may conduct acoustic source localization and/or ambient noise suppression.

Alternatively, tracking device 424 may be the controller of the user device 400. The controller may use a combination of built-in accelerometers and infrared detection to sense its position in 3D space when pointed at the LEDs in a sensor nearby, attached to, or integrated into the console of the entertainment system. This design allows users to control functionalities of the user device 400 with physical gestures as well as button-presses. The controller connects to the user device 400 using wireless technology that allows data exchange over short distances (e.g., 30 feet). The controller may additionally include a "rumble" feature (i.e., a shaking of the controller during certain points in the game) and/or an internal speaker.

The controller may additionally or alternatively be designed to capture biometric readings using sensors in the remote to record data including, for example, skin moisture, heart rhythm, and muscle movement.

As noted above, the user device 400 may be an electronic gaming console. Alternatively, the user device 400 may be implemented as a general-purpose computer, a set-top box, or a hand-held gaming device. Further, similar user devices may contain more or less operating components.

CPU 404, vector unit 406, graphics processing unit 408, and I/O processor 410 communicate via system bus 436. Further, the CPU 404 communicates with the main memory 402 via a dedicated bus 438, while the vector unit 406 and the graphics processing unit 408 may communicate through a dedicated bus 440. The CPU 404 executes programs stored in the OS ROM 426 and the main memory 402. The main memory 402 may contain pre-stored programs and programs transferred through the I/O Processor 410 from a CD-ROM, DVD-ROM, or other optical disc (not shown) using the optical disc control unit 432. The I/O processor 410 primarily controls data exchanges between the various devices of the user device 400 including the CPU 404, the vector unit 406, the graphics processing unit 408, and the controller interface 414.

The graphics processing unit 408 executes graphics instructions received from the CPU 404 and the vector unit 406 to produce images for display on a display device (not shown). For example, the vector unit 406 may transform objects from three-dimensional coordinates to two-dimensional coordinates, and send the two-dimensional coordinates to the graphics processing unit 408. Furthermore, the sound processing unit 430 executes instructions to produce sound signals that are outputted to an audio device such as speakers (not shown).

A user of the user device 400 provides instructions via the controller interface 414 to the CPU 404. For example, the user may instruct the CPU 404 to store certain information on the memory card 416 or instruct the user device 400 to perform some specified action.

Other devices may be connected to the user device 400 via the USB interface 418, the IEEE 1394 interface 420, and the AUX interface 422. Specifically, a tracking device 424, including a camera or a sensor may be connected to the user device 400 via the AUX interface 422, while a controller may be connected via the USB interface 418.

The present invention may be implemented in an application that may be operable using a variety of devices. Non-transitory computer-readable storage media refer to any medium or media that participate in providing instructions to a central processing unit (CPU) for execution. Such media can take many forms, including, but not limited to, non-volatile and volatile media such as optical or magnetic disks and dynamic memory, respectively. Common forms of non-transitory computer-readable media include, for example, a floppy disk, a flexible disk, a hard disk, magnetic tape, any other magnetic medium, a CD-ROM disk, digital video disk (DVD), any other optical medium, RAM, PROM, EPROM, a FLASHEPROM, and any other memory chip or cartridge.

Various forms of transmission media may be involved in carrying one or more sequences of one or more instructions to a CPU for execution. A bus carries the data to system RAM, from which a CPU retrieves and executes the instructions. The instructions received by system RAM can optionally be stored on a fixed disk either before or after execution by a CPU. Various forms of storage may likewise be implemented as well as the necessary network interfaces and network topologies to implement the same.

The foregoing detailed description of the technology has been presented for purposes of illustration and description. It is not intended to be exhaustive or to limit the technology to the precise form disclosed. Many modifications and variations are possible in light of the above teaching. The described embodiments were chosen in order to best explain the principles of the technology, its practical application, and to enable others skilled in the art to utilize the technology in various embodiments and with various modifications as are suited to the particular use contemplated. It is intended that the scope of the technology be defined by the claim.

What is claimed is:

1. A system for online tournament streaming, the system comprising:
   a game network server that tracks real-time gameplay data associated with a plurality of user accounts, the tracked data indicating gameplay of a plurality of game titles; and
   a tournament server that:
      receives a request for a tournament, wherein the request further specifies one or more parameters for one or more of the game titles, the parameters including one or more seeding qualifications for one or more brackets of the tournament,
      ranks the user accounts based on the gameplay data that meets the seeding qualifications of the specified parameters for the specified game titles,
      identifies a set of the user accounts as qualified to be seeded for the tournament based on the ranking,
      seeds each of the qualified user accounts to a corresponding match within one of the brackets of the tournament based on the ranking,
      generates a stream for the corresponding match in the bracket, wherein the stream is associated with the user accounts assigned to the corresponding match, and
      distributes the generated stream to one or more user devices over a communication network.

2. The system of claim 1, wherein the tournament server seeds each of the qualified user accounts to the corresponding match by determining a seeding for each of the qualified user accounts.

3. The system of claim 1, wherein the tournament server further weights the specified parameters based on one or more preferences of a tournament organizer associated with the request.

4. The system of claim 1, wherein the tournament server further tags the stream to indicate data regarding the corresponding match.

5. The system of claim 4, wherein the stream is tagged to indicate at least one of a player, team, game title, rank designation, or type of in-game event.

6. The system of claim 1, wherein the tournament server further generates a notification that includes a link to the stream when tracked gameplay data associated with the corresponding match meets one or more stored metrics associated with a predefined designation of notability.

7. The system of claim 6, wherein the link is associated with the predefined designation of notability, and wherein selection of the link initiates a jump directly to a portion of the stream associated with the predefined designation.

8. The system of claim 6, wherein the tournament server further sends the notification to a subscriber device based on the predefined designation of notability corresponding to one or more subjects of interest indicated in a profile associated with the subscriber device.

9. The system of claim 1, wherein the tournament server further:
   filters a plurality of streams associated with the bracket based on a selected parameter; and
   generates a display of the filtered streams, wherein at least one stream is associated with a visual indicator regarding a predefined designation of notability.

10. A method for online tournament streaming, the method comprising:
    receiving tracked real-time gameplay data associated with a plurality of user accounts, the tracked data indicating gameplay of a plurality of game titles;
    receiving a request for a tournament, wherein the request further specifies one or more parameters for one or more of the game titles, the parameters including one or more seeding qualifications for one or more brackets of the tournament;
    ranking the user accounts based on the gameplay data that meets the seeding qualifications of the specified parameters for the specified game titles;
    identifying a set of the user accounts as qualified to be seeded for the tournament based on the ranking;
    seeding each of the qualified user accounts to a corresponding match within one of the brackets of the tournament based on the ranking;
    generating a stream for the corresponding match in the bracket, wherein the stream is associated with the user accounts assigned to the corresponding match; and
    distributing the generated stream to one or more user devices over a communication network.

11. The method of claim 10, wherein seeding each of the qualified user accounts to the corresponding match includes determining a seeding for each of the qualified user accounts.

12. The method of claim 10, further comprising weighting the specified parameters based on one or more preferences of a tournament organizer associated with the request.

13. The method of claim 10, further comprising tagging the stream to indicate data regarding the corresponding match.

14. The method of claim 13, wherein the stream is tagged to indicate at least one of a player, team, game title, rank designation, or type of in-game event.

15. The method of claim 10, further comprising generating a notification that includes a link to the stream when tracked gameplay data associated with the corresponding match meets one or more stored metrics associated with a predefined designation of notability.

16. The method of claim 15, wherein the link is associated with the predefined designation of notability, and wherein selection of the link initiates a jump directly to a portion of the stream associated with the predefined designation.

17. The method of claim 15, further comprising sending the notification to a subscriber device based on the predefined designation of notability corresponding to one or more subjects of interest indicated in a profile associated with the subscriber device.

18. The method of claim 10, further comprising:
    filtering a plurality of streams associated with the bracket based on a selected parameter; and generating a display of the filtered streams, wherein at least one stream is associated with a visual indicator regarding a predefined designation of notability.

19. A non-transitory computer-readable storage medium, having embodied thereon a program executable by a processor to perform a method for online tournament streaming, the method comprising:

tracking real-time gameplay data associated with a plurality of user accounts, the tracked data indicating gameplay of a plurality of game titles;

receiving a request for a tournament, wherein the request further specifies one or more parameters for one or more of the game titles, the parameters including one or more seeding qualifications for one or more brackets of the tournament;

ranking the user accounts based on the gameplay data that meets the seeding qualifications of the specified parameters for the specified game titles;

identifying a set of the user accounts as qualified to be seeded for the tournament based on the ranking;

seeding each of the qualified user accounts to a corresponding match within one of the brackets of the tournament based on the ranking;

generating a stream for the corresponding match in the bracket, wherein the stream is associated with the user accounts assigned to the corresponding match; and distributing the generated stream to one or more user devices over a communication network.

* * * * *